Dec. 10, 1929.  R. R. BOLT  1,738,983
HOT BED FOR ROLLING MILLS
Filed March 10, 1927  5 Sheets-Sheet 1

INVENTOR
Rufus R. Bolt
by Parker & Prochnow
ATTORNEYS.

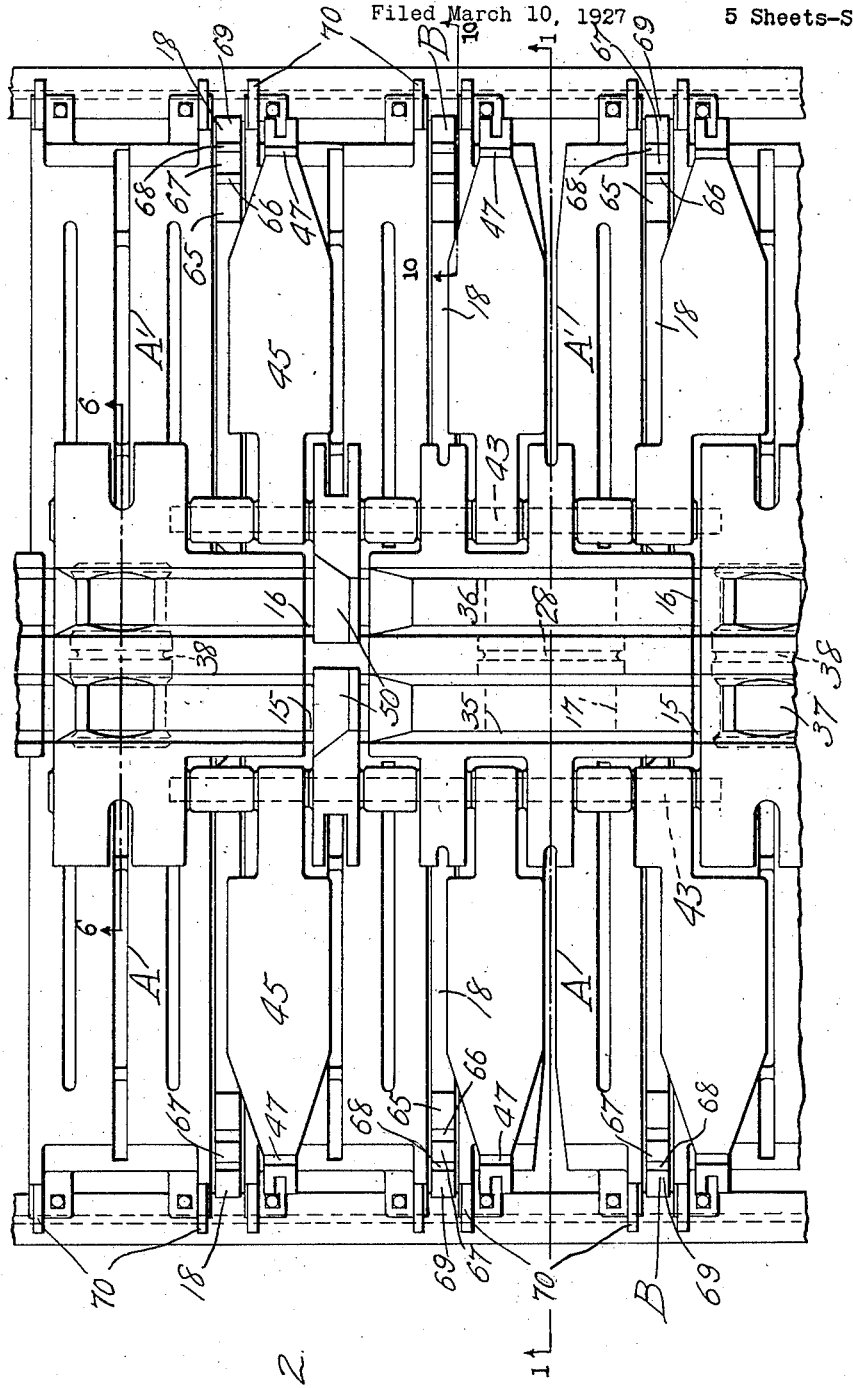

Dec. 10, 1929.   R. R. BOLT   1,738,983
HOT BED FOR ROLLING MILLS
Filed March 10, 1927   5 Sheets-Sheet 3
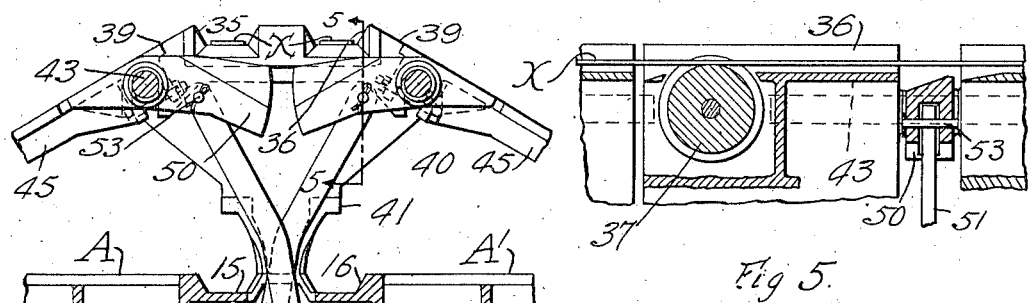
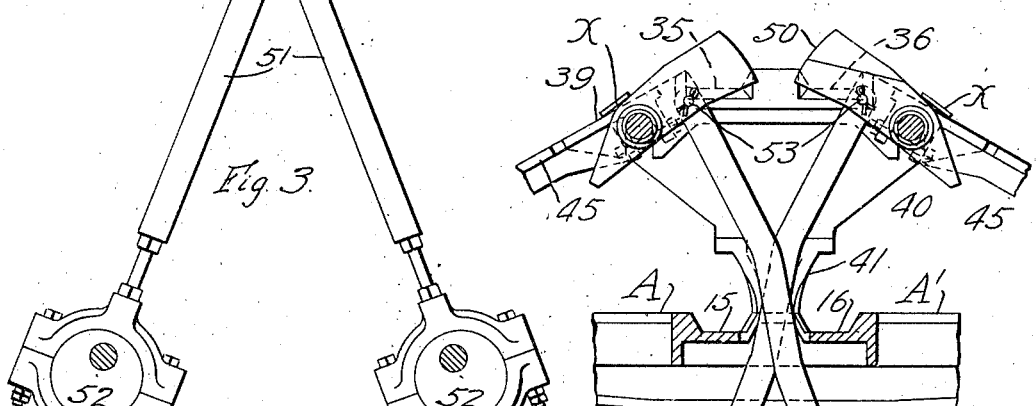
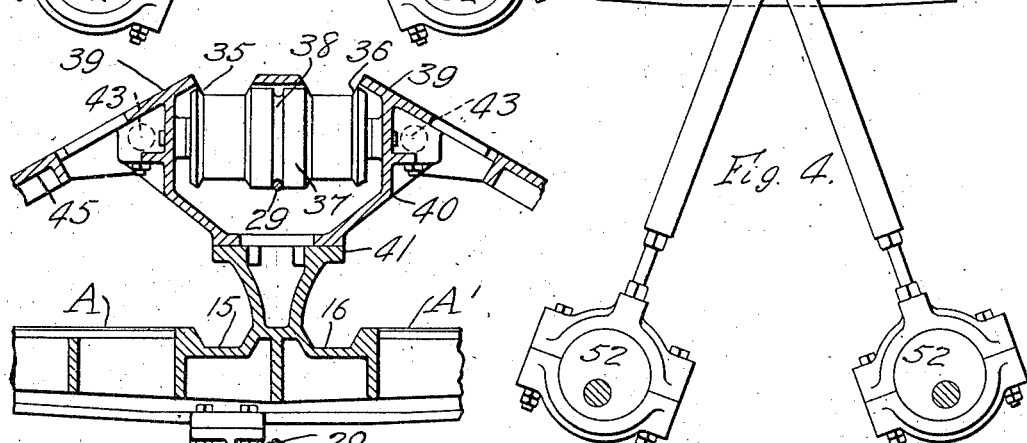
INVENTOR.
Rufus R. Bolt
by Parker & Prochnow
ATTORNEYS.

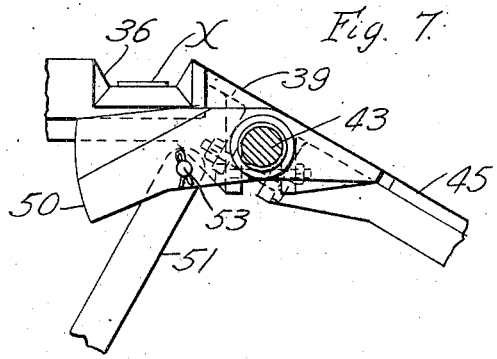
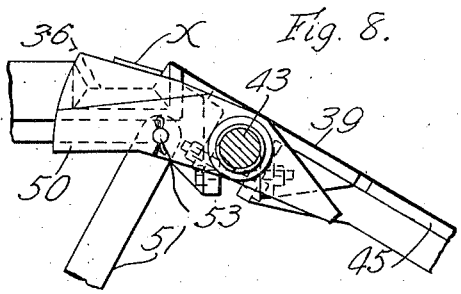
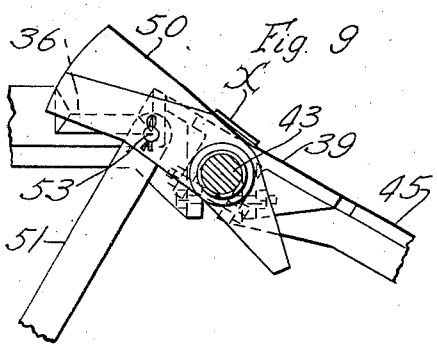
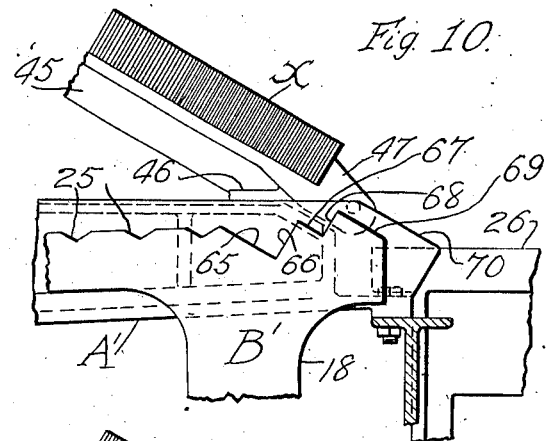
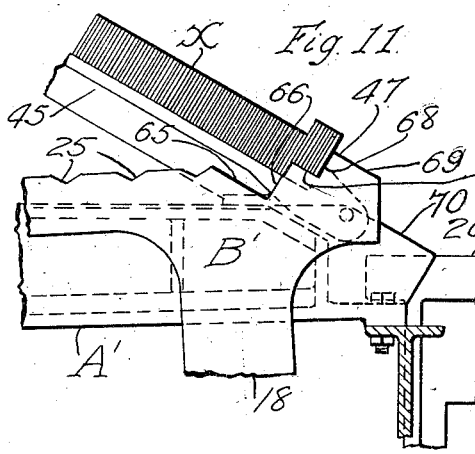
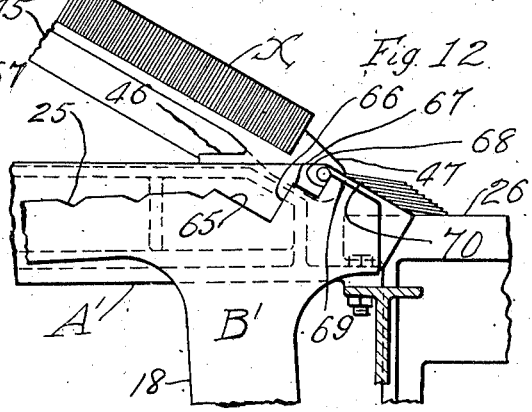

Dec. 10, 1929.   R. R. BOLT   1,738,983
HOT BED FOR ROLLING MILLS
Filed March 10, 1927   5 Sheets-Sheet 5
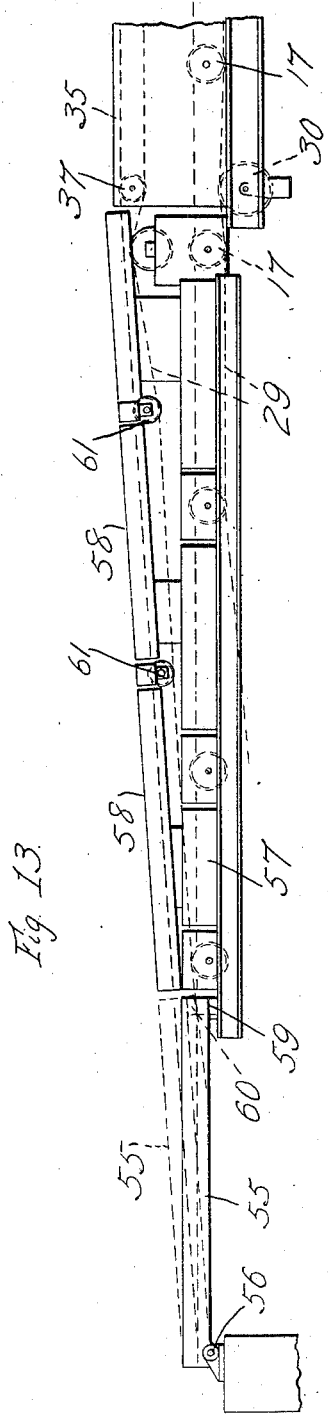
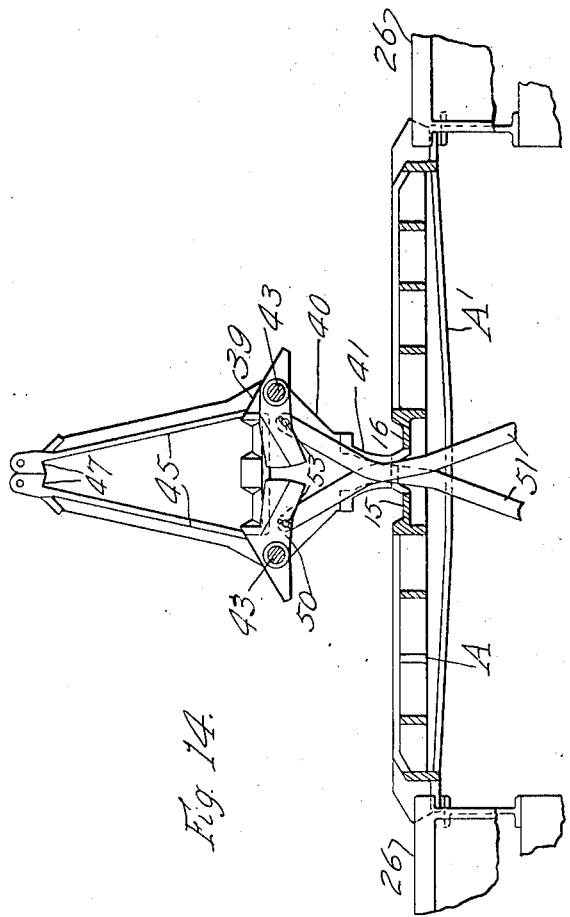
INVENTOR.
Rufus R. Bolt
by Parker & Prochnow
ATTORNEYS.

Patented Dec. 10, 1929

1,738,983

UNITED STATES PATENT OFFICE

RUFUS R. BOLT, OF BUFFALO, NEW YORK; ANNIE F. BOLT ADMINISTRATRIX OF SAID RUFUS R. BOLT, DECEASED

HOTBED FOR ROLLING MILLS

Application filed March 10, 1927. Serial No. 174,351.

This invention relates to hot beds for use in connection with steel rolling mills, and upon which the rolled products are placed for cooling.

In mechanical hot beds as heretofore made the rolled products are cooled by the surrounding air, and this cooling sometimes is sufficiently rapid to cause hardening of the rolled steel products. In the manufacture of steel for use in making vehicle springs or the like, and in certain other kinds of rolled steel, the hardening of the steel is objectionable. Consequently hot beds as heretofore made, in which the several rolled articles are supported in spaced relation to each other, are not suitable for the production of material which is to be cooled slowly or annealed. Also in hot beds as heretofore made the material was passed sideways over the hot bed intermittently so that a considerable interval of time elapses before the rolled products reach the discharge side of the hot bed. Consequently if it is desired to shear rolled products while hot, most of the hot beds as heretofore made do not feed the products across the hot beds at sufficient speed to make it possible to get the products to the shears or other tools at a high enough temperature.

The objects of this invention are to provide a hot bed which is capable of supporting rolled articles in close proximity to each other so that the cooling of the articles is retarded, resulting in an annealing of the steel of which the articles are made; also to provide a hot bed of this kind which is constructed so that the rolled articles can be discharged therefrom immediately if it is desired to perform further operations upon the articles while hot; also to provide a hot bed of this kind which is so constructed that it can be positioned over another hot bed of usual construction in such a manner that either hot bed may be employed, depending upon the material which is being rolled; also to provide an adjustable trough section or guide which may be employed for guiding the rolled products to either of the hot beds; also to so arrange the upper or annealing hot bed with reference to the lower hot bed that the same drive mechanism may be used for both hot beds; also to so construct the upper or annealing hot bed that the same mechanism which is employed for discharging the rolled products from the lower hot bed may be used for discharging the products from the upper hot bed; also to so construct the upper hot bed that parts thereof may readily be moved or swung out of operative position so as not to interfere in any way with the use of the lower hot bed; also to improve the construction of hot beds in other respects hereinafter mentioned.

In the accompanying drawings,

Fig. 2 is a fragmentary, top plan view thereof.

Fig. 3 is a fragmentary, transverse, sectional elevation thereof, showing the means for removing the rolled products from troughs of the upper hot bed.

Fig. 4 is a similar sectional elevation, showing the parts in different positions.

Fig. 5 is a fragmentary, longitudinal, sectional elevation thereof on line 5—5, Fig. 3.

Fig. 6 is a fragmentary, transverse, sectional elevation thereof on line 6—6, Fig. 2.

Figs. 7, 8 and 9 are fragmentary, sectional elevations similar to Fig. 3, showing various positions of the parts of the mechanism for lifting the bar from the trough to the hot bed.

Figs. 10, 11 and 12 are fragmentary, transverse, sectional elevations thereof on line 10—10, Fig. 2, showing the mechanism for discharging the rolled products from the upper hot bed.

Fig. 13 is a side elevation of the receiving end of the hot bed, showing an adjustable guide member or trough section for guiding the rolled products either to the lower or to the upper hot bed.

Fig. 14 is a fragmentary, transverse, sectional elevation on a reduced scale showing the parts of the upper hot bed swung into inoperative positions to permit the lower hot bed to be used.

Figure 1:
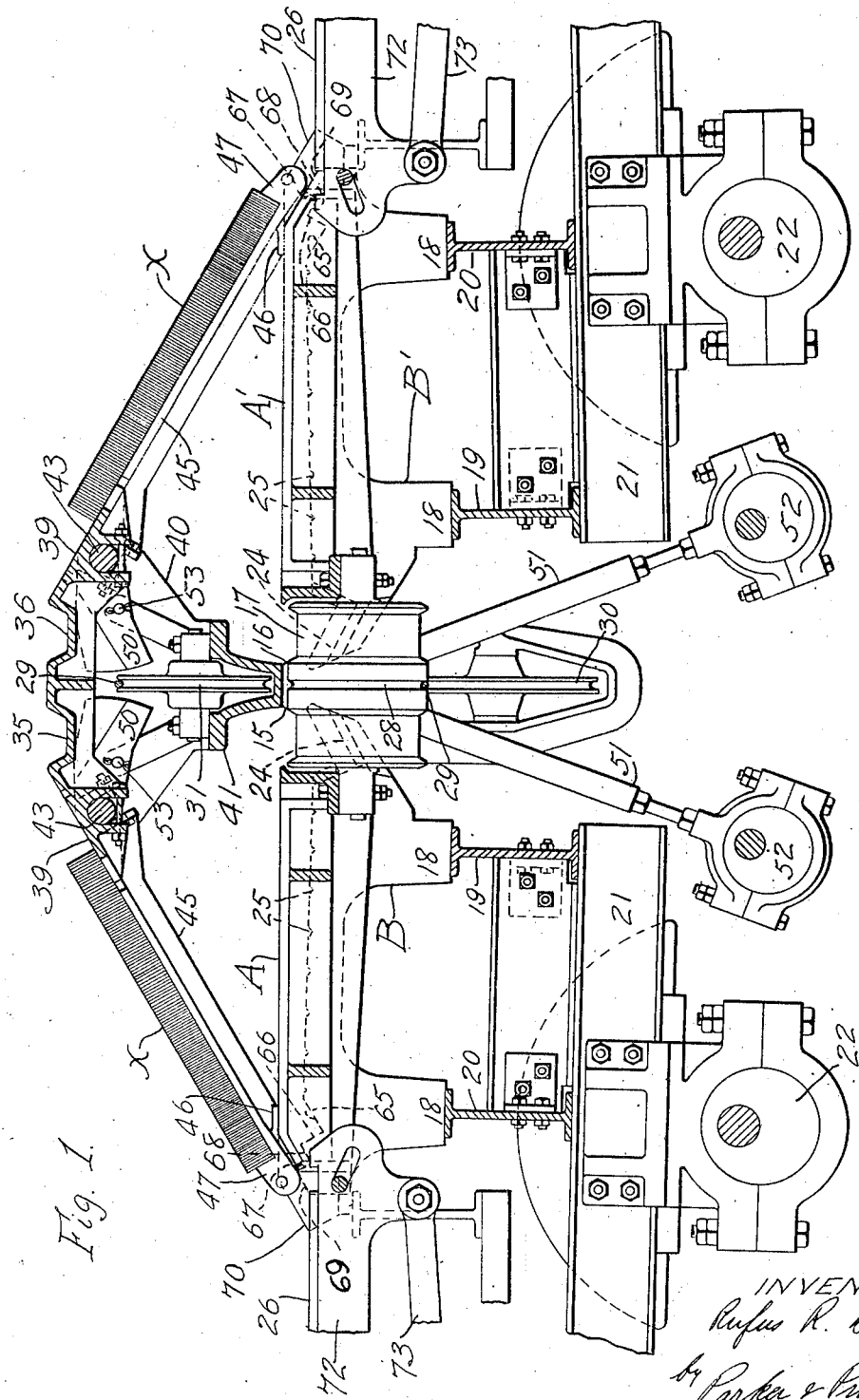
Fig. 1 is a transverse, sectional elevation of a hot bed embodying this invention, showing the same positioned above a hot bed of the construction heretofore commonly employed, the section being taken on line 1—1, Fig. 2.

The invention is illustrated in the accompanying drawings as applied to a double hot bed in which the troughs and rollers for feeding the work to the hot bed are arranged intermediate between the two parts of the hot bed. It will be understood, however, that the invention is equally applicable to a single hot bed. Furthermore the improved hot bed is shown superimposed upon a hot bed of ordinary construction, but it will be understood that it is not intended to limit the invention to this arrangement.

A and A' represent two hot beds or parts of a hot bed of well known construction, to which the rolled products are fed by a pair of troughs 15 and 16, Fig. 6, and a series of work advancing rollers 17. It will be understood that this trough with driven rollers arranged intermittently along the length receives rolled products from the rolling mill, so that the work after it is discharged from the last set of rolls is passed to either one of the troughs 15 and 16 and is advanced along the trough by the rollers 17. When the rolled product in a trough has arrived at the portion of the hot bed at which it is desired to discharge the same to the hot bed, this is effected by means of lifting racks B and B' which may be actuated at will to lift the bar from the troughs 15 and 16 respectively and lay the same upon the hot bed A or A'. Each lifting rack includes a number of grids or bars 18 arranged in transverse slots or spaces in the hot bed and normally arranged with their upper surfaces below the top or supporting surface of the hot bed. These grids or bars of the lifting rack are supported in the usual manner upon a pair of longitudinally extending beams 19 and 20 which in turn are secured to cross beams 21, and an eccentric 22 serves to impart movement to the cross beams and the lifting racks supported thereby. Each grid or bar 18 of the lifting rack is provided with a part or extension 24 which normally remains underneath the trough with which the rack cooperates, and during the movements imparted to the lifting rack by means of the eccentric 22, this extension 24 moves upwardly and raises the work from the trough, and then laterally away from the trough to deposit the work upon the hot bed. The top surfaces of the grids or bars 18 of the lifting rack are provided with notches or recesses 25 which are so positioned that during the upward movement of the bars or grids these notches or recesses will engage the rolled bars or products and lift them upwardly and then again deposit them in another position on the hot bed further removed from the trough. Eventually these grids or bars move the work to the discharge side of the hot bed, from which it is finally discharged by the lifting rack and deposited upon an assembly table or pull-over stand 26.

The work advancing rollers 17 may be driven in any suitable or desired manner, a cable drive being employed in the construction shown, and for this purpose the rollers are provided with central grooves 28 in which a cable 29 is adapted to operate, and 30 represents the usual idler pulleys or sheaves over which the cable passes and which are so positioned as to cause the cable to be pressed into engagement with the groove 28. 31 represents another series of idler pulleys or sheaves over which the return run of the cable 29 passes. All of these parts of the lower hot bed have heretofore been commonly used and of themselves constitute no part of this invention.

The rolled work is fed to my improved hot bed by means of a pair of troughs 35 and 36 arranged above the troughs 15 and 16, and rollers 37 are provided at intervals along the troughs to advance the work in these troughs. These rollers may be similar in construction to the rollers 17 already described and each roller includes two trough shaped depressions adapted to receive the rolled products and to advance them as the rollers are turned, and the intermediate portion of each roller is also provided with an annular groove 38 into which the cable 29 is pressed by the idler rollers 31. These rollers 37 are driven by the return run of the cable 29 and consequently these rolls will be driven in the reverse direction from the rollers 17, thus making it necessary to reverse the direction of movement of the cable when the material is fed to the upper hot bed. Any other drive for the rollers 37 may, of course, be used, that shown being desirable, since by the construction described the same drive is used for operating both the upper and lower rollers.

The edges of the two troughs 35 and 36 terminate in downwardly and outwardly sloping portions 39. The troughs 35 and 36, as is customary, are built in sections arranged end to end lengthwise of the hot bed and some of these sections include rollers 37. The bearings for these rollers are preferably formed integral with the castings of which the troughs form a part, and these castings may be suitably supported from the lower hot bed in any suitable or desired manner. In the particular construction shown the castings and frames of the trough portions 35 and 36 have downwardly extending base portions 40 which are supported on upwardly extending portions 41 preferably formed integral with the troughs 15 and 16 of the lower hot bed. By means of this arrangement the troughs 35 and 36 together with the rollers for advancing the work in the troughs can be supported on the troughs 15 and 16 so as not to interfere in any way with the operation of the lower hot bed, the projection 41 of the troughs 15 and 16 being arranged between the troughs.

The upper hot bed is preferably provided at each side of the troughs 35 and 36 with shafts 43 extending lengthwise thereof and suitably secured in any desired manner on the casting in which the troughs 35 and 36 are formed and below the inclined portions 39 of these castings. These shafts may serve, in the first place, to support a plurality of skids or inclined rack members 45, the upper edge portions of which are pivotally connected with the shafts 43. these supporting racks may be of any desired shape or construction and any desired number of these rack members may be used, depending upon the nature of the work which is to be supported, the supporting racks being arranged sufficiently closely together to prevent the hot rolled products supported thereon from sagging between the supporting racks or skids. The lower ends of these skins or rack members 45 are provided with foot or base portions 46 which are so formed as to rest upon the supporting surfaces A of the lower hot bed. The skids or rack members are also provided near their lower ends with upwardly extending stop projections 47 against which the work comes to a stop after it has been discharged on the skids or rack members 45. As the result of this construction these skids or rack members may be swung upwardly by hand or otherwise about the shafts 43 as shown in Fig. 14 and thus leave the lower hot bed available for use without interference in any way by any part of the upper hot bed. When in their lower position as shown in Fig. 1, the skids form substantially continuations of the inclined surfaces 39, so that any work discharged sidewise out of either of the troughs 35 or 36 will roll or slide down the inclined surfaces 39 and the skids 45 until it contacts with the stop members 47. The pivoted connection of the skid members with the trough is shown merely for the purpose of illustration and it will be understood that any manner of providing work supporting skids or surfaces inclined downwardly from the troughs 35 and 36 may be employed in place of the construction shown.

The discharge of bars or other rolled products from the troughs 35 and 36 may be effected in any suitable or desired manner. In the particular construction shown a plurality of lifting bars 50 are arranged at intervals lengthwise of the hot bed and between adjacent sections of the trough castings. These lifting bars, in the particular form shown, are also pivoted on the shafts 43 and are adapted to be swung upwardly about the shafts 43 by means of rods 51 actuated by eccentrics 52, the rods being pivoted at 53 to the lifting bars 50. Consequently it will be obvious that as the eccentrics 52 are swung about their shafts, the arms 51 and lifting bars 50 are raised as indicated in Fig. 4, thus discharging any material contained in the troughs 35 or 36 over the side edges of these troughs under the inclined surfaces 39. Any other means, however, may be employed for lifting the work out of the troughs. It will also be understood that the eccentrics 52 are operated individually so that the lifting bars for either trough may be actuated as desired.

At the receiving end of the hot bed as illustrated in Fig. 13 a trough member 55 is provided which is pivoted at one end thereof at 56, and the other end of this trough member is adapted to be moved either into alinement with a series of trough members 57 leading to the troughs of the lower hot bed, or the pivoted trough member 55 may be swung into the dotted line position shown in Fig. 13, in which case the trough member 55 is arranged in alinement with a series of trough members 58 arranged at an inclination and terminating in the troughs 35 and 36 of the upper hot bed. Any suitable means for supporting the pivoted trough member 55 in either of its two positions may be employed, a fixed block 59 supporting the free end of the trough member 55 when the same is arranged in its horizontal position to supply the work to the trough members of the lower hot bed, and another support or block 60 may be placed upon the fixed block 59 so that the free end of the pivoted trough member 55 may rest thereon when in its inclined position as shown in dotted lines in Fig. 13 to deliver the rolled products to the inclined trough member 58. Other means for supporting the pivoted trough member in either of its positions may be employed, or, if desired, other means may be used for conveying the rolled products to either the troughs of the upper or of the lower hot bed.

In the use of the apparatus thus far described, if the pivoted trough member 55 is arranged in the dotted line position shown in Fig. 13, the hot rolled products from the last set of rolls of a rolling mill will pass upwardly on the inclined pivoted trough member 55 and up in the inclined trough member 58, rollers 61 similar to the rollers 17 or 37, which have already been described, serving to continue the movement to the rolled products up the inclined trough members. The hot rolled products thus are fed to the two troughs 35 and 36, and after passing along these troughs to the desired distance, the lifting bars 50 of the troughs are actuated by means of the corresponding eccentrics 52. This causes the rolled product or bar X to be raised out of the trough from the position shown in Fig. 7 to the position shown in Fig. 8, and upon further upward movement of the lifting bar 50, the work X slides down on the lifting bars and over the inclined surfaces 39 upon the skids or rack members 45 and continues to slide down these rack members until it reaches the stop projections 47 at the lower ends of the skids. When the work is in the form of bars or strips used for making springs, such as shown in the drawings, the first bar after reaching the stop 37 is turned on edge manually into the position shown in Fig. 10, and the succeeding bars are also turned on their edges and placed flatly against the preceding bars, until a stack of bars is formed, as illustrated in Fig. 10. By arranging these rolled products in the manner shown in Fig. 10, the cooling of the bars or products is retarded by adjacent bars X so that a very gradual cooling of the rolled products takes place. This arrangement of the rolled products in contact with each other has been found to cause the heat to be retained in the work for a sufficient length of time so that the work is annealed and rendered much more easily workable than if the work were passed sidewise over the lower hot bed so that each piece of work is separated from the other pieces. The arrangement of the rolled products in this manner also prevents warping of the rolled products. It has been found that work arranged in this manner upon the upper hot bed does not have to be subjected to an additional annealing process after the same is discharged from the upper hot bed. It has also been found that by causing the work which is discharged from a trough to slide down the inclined skids or rack members 45, the work thus discharged will abut against the work already arranged edgewise on the lower portions of the rack or skid members and thus compact the edgewise work and straighten it out, thus resulting in an efficient packing of the work together to retard the radiation of heat therefrom. By means of this arrangement a considerable quantity of rolled steel can be stacked upon the skids of the upper hot bed, so that the work can remain there for a sufficient period of time to permit the gradual cooling of the work.

The removal of the work from the lower portion of the skids or rack members, after the same has been cooled to a sufficient extent, may be effected in any suitable or desired manner. In the particular construction illustrated the lifting racks B and B' of the lower hot bed are utilized for this purpose. In order to adapt the lifting racks for this purpose the outer edge portions thereof are slightly changed, this being done in the particular construction illustrated by forming recesses 65 in the upper surfaces of the lifting racks near the discharge ends thereof, resulting in the forming of shoulders 66, which extend at an inclination preferably approximately the same as that of the work engaging faces of the stop portions 47 of the skids or rack members. From the upper edges of these shoulders, inclined work-supporting faces 67 extend at an inclination substantially similar to the inclination of the upper faces of the skids 45. These work-supporting faces of the lifting racks terminate in shouldered portions 68, from the upper edges of which the ends of the lifting racks slope downwardly as indicated at 69.

As the result of this construction when the lifting racks B, B' are actuated by means of the eccentrics 22, the inclined surfaces 67 move underneath the work X arranged at the lower end of the skids or rack members 45 and raise some of the work, as shown in Fig. 11. The shoulders 66 at the same time move along the next adjacent bar or work of the stack and hold the same in its inclined position so that when the bars which are removed by the inclined portion 67 of the lifting rack no longer support the stack of work on the skids 45, the shoulders 66 constitute such a support. After the lifting rack has raised some of the work adjacent to the stop portion 47 of this stop portion, this work will be held in its edgewise position by the shoulder or supporting part 68, and during the continued movement of the lifting rack, the shoulders 66 will permit the stack of work to move downwardly along the skids into engagement with the stop shoulders 47. Upon the completion of the cycle of movement of the lifting racks B, B', the work supported by the faces 67 and 68 will be lowered upon the inclined face 70 of the lower hot bed A or A', and from this inclined surface the work will slide upon the assembly table or pullover stand 26, on which it may be handled in any suitable or desired manner.

When the apparatus is used for annealing rolled products, the stack of work X is added to and increased in size until the bars or strips at the lower ends of the skids are sufficiently cooled, whereupon the lifting rack B or B' is actuated to discharge a portion of the work. In this manner a continuous annealing of the rolled product results, and the work is only removed from the hot bed when the same has been sufficiently cooled so that further rapid cooling will not produce any hardening of the metal.

After the work is delivered on the pull-over or assembly table 26, which may be the same as that which has heretofore been used in connection with a lower hot bed, the work is advanced laterally by means of the usual slide 72, Fig. 1, actuated through the medium of a link 73. When the skids or inclined rack members 45 are moved into their upper positions and when the pivoted trough member 55 is lowered into the full line position shown in Fig. 13, so that the lower hot bed can be used, the lifting racks B, B', even though slightly modified in order to cooperate with the upper hot bed, function in the same manner as heretofore to advance the work toward the pull-over or assembly table.

The construction described has the advantage that either of the two hot beds is available at any time by merely changing the position of the pivoted trough member 55 and by raising or lowering the skid members 45 and the two hot beds are always in line with the finishing rolls of a mill. By arranging my improved hot bed above the one heretofore used, one set of foundations will serve for both hot beds and either hot bed may be used in connection with a series of rolls. The upper hot bed is not only useful for rolled products which are to be annealed, but also where it is desired to discharge the rolled work immediately from the troughs to the pull-over or assembly table, for example as is the case with certain alloy steel which must be cut while hot. On the lower table a quick feed of work of this kind is not possible because of the intermittent operation of the feeding and lifting racks. By means of the upper hot bed, however, a bar of this kind passes down the inclined skids immediately after being discharged from the upper trough and is therefore immediately available for placing upon the assembly or pull-over table. Other advantages of the arrangement of one hot bed over the other are that no more room is taken by the two hot beds than by one hot bed, and also the same drive mechanism runs the rollers of both beds. By means of the particular arrangement of the skids as shown in the drawings, the lifting racks for the lower hot bed may be used for removing rolled products from the lower ends of the skids and also the same pull-over or assembly table and feed mechanism connected therewith which is used for the lower hot bed can be used for handling the products discharged from the upper hot bed, so that comparatively little expense is involved in adding my improved hot bed to an already existing hot bed. By the arrangement of the skid members so that the lower ends thereof rest loosely on the lower hot bed, these skid members are free to expand and contract due to the changes in temperature.

I claim as my invention:—

1. A hot bed including a trough along which the products from a rolling mill are passed, skid members extending downwardly at an inclination from said trough, and along which hot rolled work can pass rapidly without appreciable loss of heat to the lower ends of said skid members and which may support a stack of pieces of rolled work in close proximity to each other to retard dissipation of heat therefrom, and means at the lower portions of said skid members for stopping the descent of said rolled work and against which the work may be stacked.

2. A hot bed including a trough along which the products from a rolling mill are passed, skid members extending downwardly at an inclination from said trough, stops at the lower portions of said skid members and against which pieces of hot rolled work may be stacked in close proximity to each other to retard the dissipation of heat therefrom, and means operable at will for removing a number of pieces of said work at a time from the lower ends of said skid members.

3. A hot bed including a trough along which the products from a rolling mill are passed, skid members extending downwardly at an inclination from said trough, means for discharging work from said trough to said skid members, stops at the lower portions of said skid members and against which pieces of hot rolled work may be stacked in close proximity to each other, and means operable independently of said discharging means for removing the work from the lower ends of said skid members.

4. A hot bed including a trough, skid members extending downwardly at an inclination from said trough and over which work discharged from said trough passes by gravity rapidly and without interruption and appreciable loss of heat to the lower ends of said skid members, and stops at the lower ends of said skid members against which work may be stacked while supported on said skid members.

5. A hot bed including a trough, skid members extending downwardly at an inclination from said trough and over which work discharged from said trough passes by gravity to the lower ends of said skid members, and means for discharging the work from the lower ends of said skid members.

6. A hot bed for a rolling mill, including a trough along which products from said rolling mill are passed, a plurality of stationary skid members connected at their upper ends with said trough and extending downwardly from said trough at an inclination so that products discharged from said trough upon said skid members pass by gravity rapidly and without appreciable loss of heat downwardly along said inclined skid members, and stops at the lower end of said skid members against which work may be stacked while supported on said skid members.

7. A hot bed for a rolling mill, including a trough along which products from said rolling mill are passed, a plurality of skid members connected at their upper ends with said trough and extending downwardly from said trough at an inclination and having substantially plane surfaces upon which products discharged from said trough upon said skid members pass by gravity downwardly and without appreciable loss of heat along said inclined skid members, means cooperating with said trough for discharging rolled products from said trough to said skid members, and stops at the lower ends of said skid members for limiting the downward movement of said rolled products and against which said rolled products may be stacked on said skid members.

8. A hot bed for a rolling mill, including a trough along which products from said rolling mill are passed, a shaft mounted on said trough, and a plurality of skid members arranged at an inclination downwardly from said trough and having their upper ends pivotally mounted on said shaft to enable said skid members to swing about said shaft into inoperative positions, and adapted to cause work discharged from said trough to said skid members to be discharged downwardly along said skid members by gravity.

9. A hot bed for a rolling mill, including a trough along which products from said rolling mill are passed, a shaft mounted on said trough, a plurality of skid members arranged at an inclination downwardly from said trough and having their upper ends pivotally mounted on said shaft, and adapted to cause work discharged from said trough to said skid members to be discharged downwardly along said skid members by gravity, and lifting bars pivoted on said shaft and adapted to swing into positions to raise the work out of said trough and discharge the same upon said inclined skid members.

10. A hot bed for a rolling mill, including a trough along which products from said rolling mill are passed, and a plurality of skid members connected at their upper ends with said trough and extending downwardly from said trough at an inclination so that products discharged from said trough upon said skid members pass by gravity downwardly along said inclined skid members, the lower ends of said skid members resting loosely on a support so that said skid members are free to expand and contact due to changes in their temperature.

11. The combination with a lower hot bed for a rolling mill and a trough for conducting rolled products to said hot bed, of a second trough arranged above said first mentioned trough, and skid members extending from said upper trough to the lower hot bed and on which rolled products discharged from said trough may pass by gravity into operative relation to said lower hot bed.

12. The combination with a lower hot bed for a rolling mill, a trough for conducting rolled products to said hot bed, and means for moving rolled products across said hot bed, of a second trough arranged above said first mentioned trough, and skid members extending from said upper trough to the lower hot bed and on which rolled products discharged from said trough may pass by gravity into operative relation to said lower hot bed, said moving means acting to remove rolled products from said skid members.

13. The combination with a lower hot bed for a rolling mill and a trough for conducting rolled products to said hot bed, of a second trough arranged above said first mentioned trough, and skid members pivotally connected near their upper ends to said upper trough and extending downwardly at an inclination from said upper trough to the lower hot bed and on which rolled products may pass by gravity into operative relation to said lower hot bed, said skid members being adapted to be swung upwardly about said pivots out of operative relation to said lower hot bed.

14. The combination with a lower hot bed for a rolling mill and a trough for conducting rolled products to said hot bed, of a second trough arranged above said first mentioned trough, and skid members extending at an inclination from said upper trough to the lower hot bed and on which rolled products from said trough may pass by gravity into operative relation to said lower hot bed, the upper ends of said skid members being pivotally mounted on said upper trough and the lower ends thereof resting loosely upon said lower hot bed.

15. The combination with a hot bed for a rolling mill and a trough for conducting rolled products to said hot bed, of a second trough arranged above said first mentioned trough, a second hot bed arranged above said first mentioned hot bed and supplied by said second trough, and means for deflecting the rolled products from a rolling mill to either of said troughs.

16. The combination with a hot bed for a rolling mill and a trough for conducting rolled products to said hot bed, of a second trough arranged above said first mentioned trough, a second hot bed arranged above said first mentioned hot bed and supplied by said second trough, and a trough section which may be arranged either horizontally to feed rolled products discharged from a rolling mill to said first mentioned trough or at an inclination to feed said products to said second trough.

17. The combination with a hot bed for a rolling mill, a trough for conducting rolled products to said hot bed, and a member for moving rolled products across said hot bed, of a second trough arranged above said first mentioned trough, skid members extending from said upper trough to said hot bed and on which rolled products discharged from said trough may pass by gravity toward said lower hot bed, said skid members having stops at the lower ends thereof, and means on said moving member for removing from said skid members rolled products engaging said stops.

18. The combination with a hot bed for a rolling mill, a trough for conducting rolled products to said hot bed, and means for moving rolled products from said trough to said hot bed and crosswise of said hot bed to the discharge side thereof, of a second trough arranged above said first mentioned trough, inclined skid members extending downwardly from said second trough to said discharge side of said hot bed and into operative relation to said moving means, and means for discharging rolled products from said second trough to said skid members, which rolled products pass by gravity to the lower end of said skid members adjacent said discharge side of said hot bed, said moving means serving to remove said products from the lower ends of said skid members.

19. A hot bed including a trough, skid members extending downwardly at an inclination from said trough and over which work discharged from said trough passes by gravity to the lower ends of said skid members, stops at the lower ends of said skid members for limiting the downward travel of the work and against which the work may be positioned edgewise, and a lifting member operable at will to remove work from said skid members adjacent to said stops.

20. A hot bed including a trough, skid members extending downwardly at an inclination from said trough and over which work discharged from said trough passes by gravity to the lower ends of said skid members, stops at the lower ends of said skid members which act to support a stack of the work edgewise on said skid members, and lifting members arranged between skid members and adapted to engage a portion of the stack of work adjacent to said stops and to lift the same out of engagement with said stops and to deposit the work so lifted beyond said skid members.

21. A hot bed including a trough, skid members extending downwardly at an inclination from said trough and over which work discharged from said trough passes by gravity to the lower ends of said skid members, stops at the lower ends of said skid members which act to support a stack of the work edgewise on said skid members, and lifting members arranged between skid members and adapted to engage a portion of the stack of work adjacent to said stops and to lift the same out of engagement with said stops and to deposit the work so lifted beyond said skid members, said lifting members having shoulders which act to support the remainder of the stack in its edgewise position and to permit said stack to slide against said stops while the lower portion of the stack is being removed by said lifting members.

22. The combination with a hot bed for a rolling mill, a trough for conducting rolled products to said hot bed, of an upper trough arranged above said first mentioned trough, a hot bed to which the rolled products from said upper trough are discharged and which is arranged above said first mentioned hot bed, and means which are adjustable to guide the hot rolled products to either of said troughs.

23. The combination with a hot bed for a rolling mill, a trough for conducting rolled products to said hot bed, of an upper trough arranged above said first mentioned trough, a hot bed to which the rolled products from said upper trough are discharged and which is arranged above said first mentioned hot bed, and a trough section which may be swung either into a position in alinement with the lower trough, or at an inclination to guide rolled products to said upper trough.

24. The combination of a lower hot bed for a rolling mill, an upper inclined hot bed arranged above said lower hot bed and terminating at its discharge side adjacent to the discharge side of said lower hot bed, troughs for conducting rolled products to either of said hot beds, and means common to both of said hot beds for removing rolled products therefrom, said upper inclined hot bed being adapted to be swung out of its operative position into an inoperative position in which the discharge side of said upper hot bed is out of operative relation to the lower hot bed, whereby either hot bed may be used in connection with a rolling mill.

RUFUS R. BOLT.